US012679289B2

(12) United States Patent
Tiekenheinrich

(10) Patent No.: US 12,679,289 B2
(45) Date of Patent: Jul. 14, 2026

(54) CAMERA MODULE FOR A VEHICLE, A VEHICLE AND A METHOD FOR ASSEMBLING A CAMERA MODULE

(71) Applicant: Motherson Innovations Company Limited, London (GB)

(72) Inventor: Ralf Tiekenheinrich, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/607,851

(22) Filed: Mar. 18, 2024

(65) Prior Publication Data

US 2024/0326716 A1 Oct. 3, 2024

(30) Foreign Application Priority Data

Mar. 31, 2023 (DE) ..................... 10 2023 108 302.3

(51) Int. Cl.
*B60R 11/04* (2006.01)
*B08B 7/02* (2006.01)
*H04N 23/51* (2023.01)

(52) U.S. Cl.
CPC ............... *B60R 11/04* (2013.01); *B08B 7/02* (2013.01); *H04N 23/51* (2023.01)

(58) Field of Classification Search
CPC .. B60R 11/04; B60R 1/22; B08B 7/02; H04N 23/51; H04N 23/52; H04N 23/57; G03B 17/08; G03B 30/00
See application file for complete search history.

(56) References Cited

U.S. PATENT DOCUMENTS

| | | | | | |
|---|---|---|---|---|---|
| 9,454,003 | B1 * | 9/2016 | Li | ........................... | G02B 7/021 |
| 2009/0294350 | A1 * | 12/2009 | Moretto | ................... | C02F 1/003 |
| | | | | | 210/450 |
| 2014/0036084 | A1 * | 2/2014 | Lu | ........................... | H04N 23/67 |
| | | | | | 348/148 |
| 2018/0243804 | A1 * | 8/2018 | Magee | .................... | B08B 7/028 |
| 2020/0252528 | A1 * | 8/2020 | Wieczorek | ............ | H04N 23/51 |
| 2023/0015119 | A1 * | 1/2023 | Coing | .............. | B60K 15/03177 |

FOREIGN PATENT DOCUMENTS

DE 10 2019 134 006 6/2021

OTHER PUBLICATIONS

German Patent Office, Appl. DE 10 2023 108 302.3, Office Action, Aug. 21, 2023.
German Patent Office, Appl. DE 10 2023 108 302.3, Decision to Grant , Jan. 30, 2024.

* cited by examiner

*Primary Examiner* — Michael Lee
(74) *Attorney, Agent, or Firm* — Jones Day

(57) ABSTRACT

The disclosure relates to a camera module for a vehicle comprising: a housing having a first end and a second end opposite to the first end; at least one camera disposed proximate to or on the first end of the housing; at least one cover glass disposed proximate to or on the second end of the housing facing the at least one camera; at least one actuator, preferably being a piezo actuator, disposed between the housing and the at least one cover glass; and at least one sealing element disposed between the at least one cover glass and the housing, wherein the at least one cover glass is configured to compressibly touch the at least one sealing element, and wherein the at least one sealing element is injection molded onto the housing by a 2K injection molding process.

13 Claims, 4 Drawing Sheets

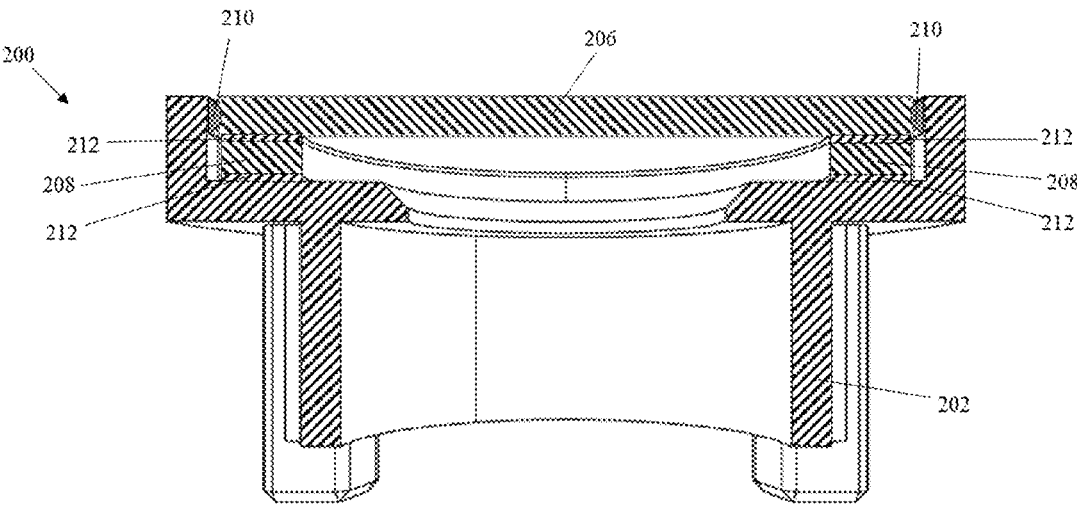
Fig. 5
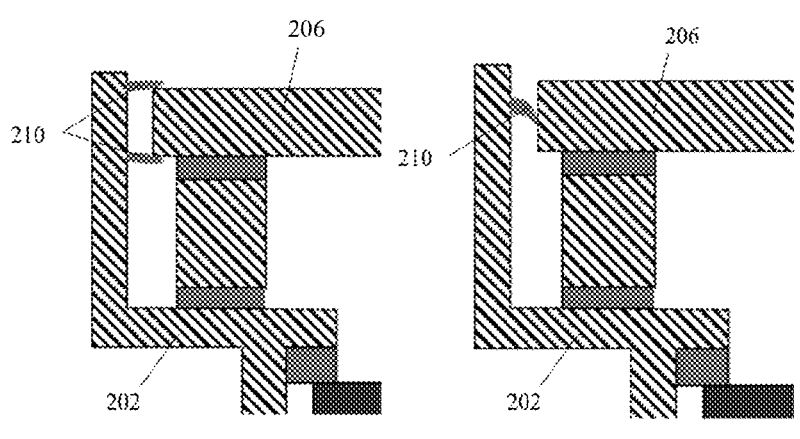
Fig. 6a
Fig. 6b
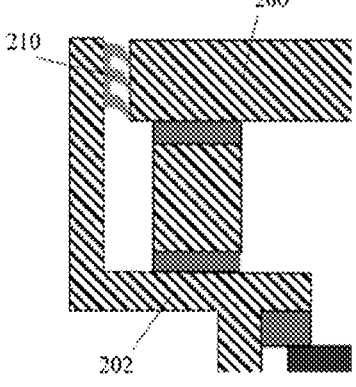
Fig. 6c

Fig. 6d                              Fig. 6e

CAMERA MODULE FOR A VEHICLE, A VEHICLE AND A METHOD FOR ASSEMBLING A CAMERA MODULE

CROSS-REFERENCE TO RELATED APPLICATION

This application claims priority to German Patent Application No. DE 10 2023 108 302.3, filed on Mar. 31, 2023, the entirety of which is incorporated herein by reference.

FIELD

The disclosure relates to a camera module for a vehicle. The disclosure further relates to a vehicle with at least one such a camera module and a method for assembling said camera module.

BACKGROUND

Assistance systems in vehicles are used to an increasing degree, for example to improve the clarity, as in the case of parallel parking, or assume other tasks or control, for example the detection of road markings, potholes, objects, nearby vehicles or traffic signs. The assistance systems often require cameras with corresponding optical devices, wherein the camera image signal is electronically evaluated to obtain views of the surrounding.

Such optical devices may be covered with soil, moisture or water droplets, for which a cleaning device is necessary in order to obtain a clear image of the surrounding or ensuring the function of corresponding assistance system.

Conventional cleaning devices include wiping elements which typically include servo motors and transmission elements, which make the cleaning device complex, expensive to manufacture and prone to maintenance. Other conventional cleaning devices include piezo actuators or cleaning the optical elements of the camera. One such cleaning device is disclosed in U.S. Pat. No. 9,376,066 B2, which discloses a piezo actuator for cleaning dust and moisture from the camera lens.

Typically, the camera module includes a housing, a camera, a cover glass and an actuator. The function of the cover glass is to protect the camera from outside dust, dirt and moisture. Thus, a scaling element is required to tightly seal the camera module such that no dust, dirt or moisture enter inside the camera module. One such sealing element is disclosed in U.S. Pat. No. 9,560,253 B2, which discloses a camera module having a sealing member.

Typically, the sealing element is an additional element which is provided during assembly of the camera module. The manufacturing of additional sealing element and its assembly makes the process cumbersome and cost ineffective. Also, precise positioning of the sealing element is required during the assembly. Any kind of misalignment or dislocation of the sealing element during assembly leads to ineffective sealing of the camera module, in which case dirt or moisture can easily enter the camera module. The sealing member disclosed in U.S. Pat. No. 9,560,253 B2 provides an additional sealing member which has the drawbacks as described above.

SUMMARY

In view of the drawbacks in the existing state of the art, it is desirous to have an effective solution for a camera module with a sealing element, wherein the camera module is easy to assemble, cost effective, easy to manufacture and provides effective sealing for preventing the camera from dirt and moisture. Thus, it is an object of embodiments of the present disclosure to further develop known camera modules to overcome the drawbacks of the prior art.

This object may be achieved, for example, by a camera module for a vehicle that includes:

a housing having a first end and a second end opposite to the first end;

at least one camera disposed proximate to (i.e., in the vicinity of) or on the first end of the housing;

at least one cover glass disposed proximate to (i.e., in the vicinity of) or on the second end of the housing facing the at least one camera;

at least one actuator, preferably being a piezo actuator, disposed between the housing and the at least one cover glass; and at least one sealing element arranged between the at least one cover glass and the housing, wherein the at least one cover glass is configured to compressibly touch the at least one sealing element; and wherein the at least one sealing element is injection molded onto the housing by 2K injection molding process.

In an embodiment, the housing and the at least one sealing element may be manufactured as one unit.

Embodiments of the camera module of the present disclosure have an advantage that they are easy to manufacture, cost effective and easy to assemble and that they provide effective sealing for preventing the camera from dirt and moisture. This may be possible, for example, since the sealing element of the camera module is injection molded onto the housing by 2K injection molding process. For example, the sealing element may be molded onto the housing using a single injection molding machine, in which materials of the housing and the sealing element are injected separately in the molding machine. This may, for example, ensure that the housing and the sealing element are not manufactured separately, and thus may save time, energy, and costs. This may also provide for easy assembling and precise positioning and placement of the sealing element on the housing, thus preventing any dislocation and misalignment of the sealing element over the housing which may occur during the assembly if the sealing element is manufactured separately. Since there is no misalignment or dislocation of the sealing element according to embodiments of the present disclosure, it may be possible to obtain effective sealing functionality between the cover glass and the housing. In addition, embodiments of the cover glass may be configured to compressibly touch the sealing element of the housing. That is to say that embodiments of the cover glass compress the sealing element against the housing in an air-tight manner. In embodiments, the air-tight sealing may be ensured between the cover glass and the housing even during the vibration of the actuator (such as a piezo actuator) for cleaning the cover glass when dirt or moisture is accumulated on the cover glass. Therefore, in such embodiments, dirt and moisture cannot enter inside the housing of the camera module at any time, i.e., when the piezo actuator is actuated or when the piezo actuator is not actuated.

In an embodiment, the at least one actuator, preferably being a piezo actuator, may be attached to the housing and the at least one cover glass by at least one, preferably double-sided, attaching means.

In an embodiment, the at least one attaching means may be an adhesive tape and/or glue.

In an embodiment, the piezo actuator provides vibration to the cover glass. When the cover glass is covered by dirt or moisture, the piezo actuator is actuated, which provides vibration to the cover glass, which in turn vibrates and shakes off the particles of dirt and dust accumulated on the cover glass.

In an embodiment, the at least one sealing element may comprise one or more sealing lips. This configuration may ensure effective sealing functionality between the cover glass and the housing. For instance the sealing element may include several sealing lips, such as two or three sealing lips, such that in case one of the sealing lip is damaged or worn, the other sealing lips may provide the sealing effect between the cover glass and the housing.

In an embodiment, the one or more sealing lips may be configured to touch a lateral surface and/or a top surface and/or a bottom surface of the at least one cover glass. This configuration of the sealing element with the cover glass may further enhance the sealing functionality from different sides of the cover glass.

In an embodiment, the housing may be made of acrylonitrile butadiene styrene (ABS), polycarbonate (PC), polypropylene (PP), acrylonitrile styrene acrylate (ASA), poly(m-ethyl methacrylate) (PMMA), (polyamide) PA, (polyethylene) PE, high density polyethylene (HDPE), polyoxymethylene (POM) or combination thereof or any other moldable plastic or diecast.

In an embodiment, the at least one sealing element may be made of thermoplastic elastomer (TPE), ethylene propylene diene monomer rubber (EPDM), plastic or any moldable sealing material.

In an embodiment, at least one grommet may be disposed between the at least one camera and the housing. The grommet may absorb the vibration provided by the piezo actuator and thus vibration effect on the camera may be reduced effectively.

Embodiments of the present disclosure also provide a vehicle comprising at least one camera module outlined above.

Embodiments of the present disclosure also provides a method of assembling at least one camera module outlined above, the method comprising:

providing a housing and at least one sealing element, wherein the housing has a first end and a second end;

mounting at least one camera at or in the vicinity of the first end of the housing;

fixing an actuator, preferably being a piezo actuator, onto the housing by at least one, preferably double-sided, attaching means; and fixing at least one cover glass onto the at least one actuator such that the at least one cover glass is facing the at least one camera, wherein the at least one cover glass is configured to compressibly touch the at least one sealing element; and wherein the at least one sealing element is injection molded onto the housing by 2K injection molding process.

The arrangement of a first component in the vicinity of the first end of the housing according to embodiments of the present disclosure is to be understood in that the arrangement of the first component is arranged closer to said first end of the housing than a second component arranged in the vicinity of the other, second, end of the housing. The second component is thus arranged closer to the second end of the housing than the first component.

BRIEF DESCRIPTION OF THE DRAWINGS

Other aspects, advantages, and salient features of the present disclosure will become apparent to those skilled in the art from the following detailed description, which taken in conjunction with the annexed figures, discloses exemplary embodiments of the disclosure, wherein:

FIG. 5: illustrates a front sectional view of the camera module of FIG. 2 according to the present disclosure;

FIGS. 6a to 6e: illustrate portion of section views of a camera module according to an embodiment of the present disclosure showing various embodiments of the sealing element according to the present disclosure.

DETAILED DESCRIPTION

It is to be understood that the embodiments described herein are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
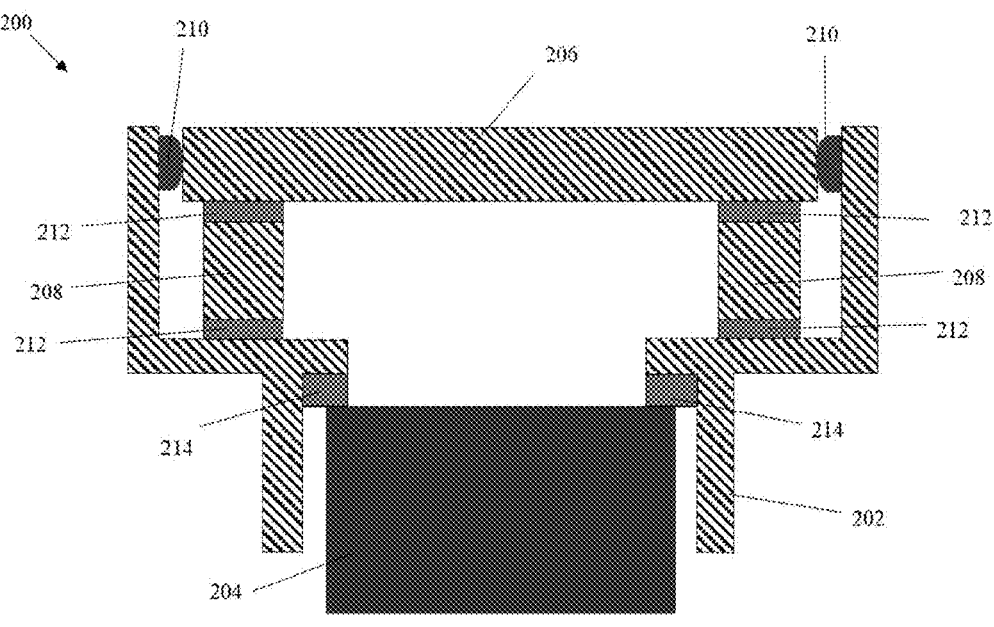
FIG. 1: illustrates a sectional overview of a camera module of a vehicle according to an embodiment of the present disclosure.
Figure 7:
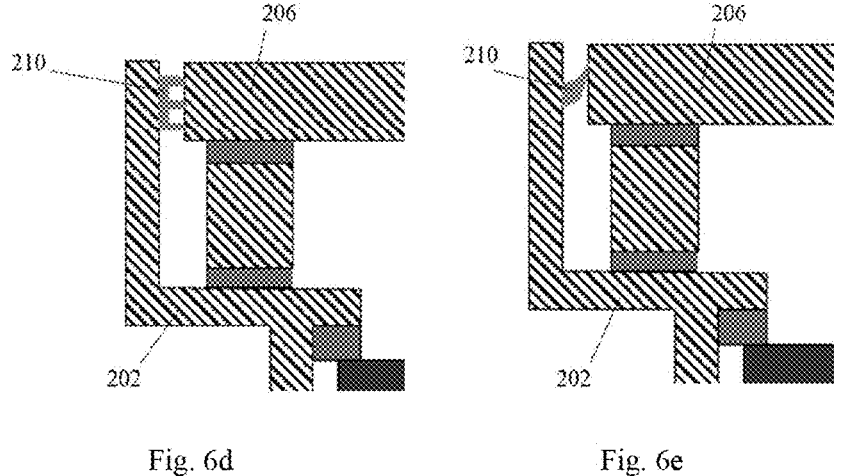
FIG. 7: is a schematic illustration of a vehicle mounted with the camera module according to an embodiment of the present disclosure.
Figure 7:
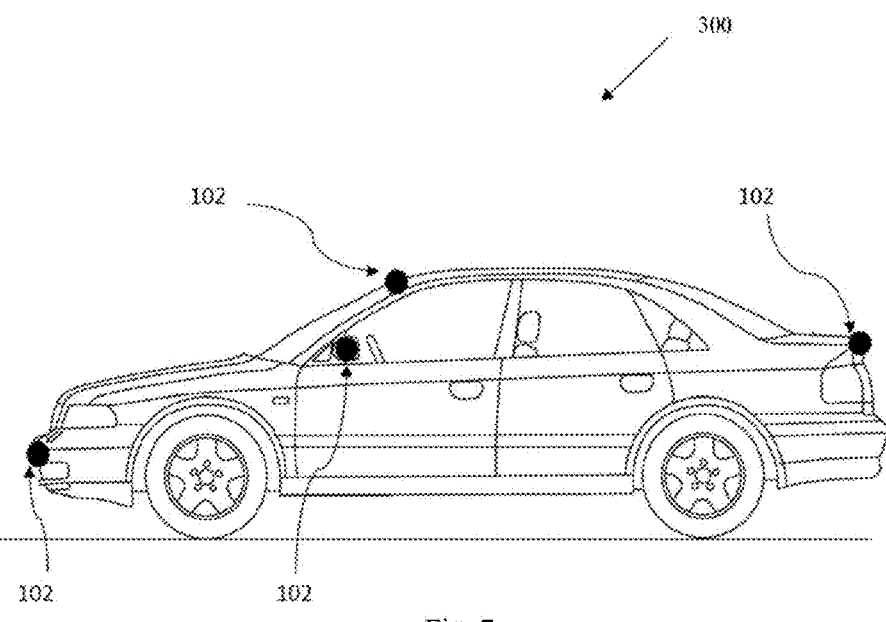

FIG. 1 illustrates sectional overview of an embodiment of a camera module 200 of a vehicle 300, which is shown in FIG. 7. The camera module 200 may be mounted on the vehicle 300 on various locations of the vehicle 300. For instance, the camera module may be mounted on a door, window triangle, front bumper, rear bumper or any other part of the vehicle. The camera module 200 is preferably configured to view the surrounding of the vehicle 300, particularly the rear view, side view or front view. The camera module 200 includes a housing 202 within which a camera 204 is mounted. The housing 202 may comprise a hollow cylindrical portion having a first end 202a and a second end 202b. The first end 202a and the second end 202b of the housing 202 are open ends. The housing 202 may be made of ABS, PC, PP, ASA, PMMA, PA, PE, HDPE, POM or combination thereof or any other moldable plastic or diecast. The camera 204 is mounted on the first end 202a of the housing 202.

The camera 204 may include a camera lens through which image signal from preferably outside the vehicle 300 surrounding enters the camera 204 which is processed to produce at least one image (static and/or dynamic (video) image). In order to obtain a good image, the light signal coming from outside the vehicle should not be distorted by any means such as dirt, dust or moisture, which may be accumulate on the camera lens. Therefore, it is important that dirt, dust or moisture should not get accumulated on the camera lens. Therefore, the sealing of the camera 204 within the housing 202 becomes significant. The camera 204 is mounted on the housing on a grommet 214. The grommet 214 is preferably configured to absorb the vibration effect on the camera 204.

According to the embodiment of FIG. 1, the camera module 200 further comprises a cover glass 206. The cover glass 206 is disposed on the second end 202b of the housing opposite to the camera 204 such that the camera lens faces the cover glass 206. The cover glass 206 may be made of transparent material which allows the light signal from outside surrounding to travel through the cover glass 206 and enter the camera lens. The cover glass 206 is provided to protect the camera from dirt, dust or moisture.

According to the embodiment of FIG. 1, the camera module 200 further comprises a piezo actuator 208. The piezo actuator 208 is disposed between the housing 202 and the cover glass 206 by a double-sided attaching means 212. The attaching means 212 may be an adhesive tape and/or glue. The piezo actuator 208 may be configured to provide vibration to the cover glass 206. When the cover glass 206 is covered by dirt or moisture the piezo actuator 208 is actuated, which provides vibration to the cover glass 206, which in turn vibrates and shakes off the particles of dirt or moisture accumulated on the cover glass 206. The piezo actuator 208 may be manually operated by a driver to clean the cover glass 206 of the camera module 200. In another embodiment, the piezo actuator 208 may be automatically controlled. In such an automatic system, the piezo actuator 208 may be connected to a controller, which may be connected to a sensor for detecting the accumulation of dirt or moisture on the cover glass 206. In such a system, when the sensor detects dirt or moisture on the cover glass 206, the sensor may transmit the information to the controller, which in turn may actuate the piezo actuator 208 which may vibrate the cover glass 206 and shake off dirt or moisture from the cover glass 206.

According to the embodiment of FIG. 1, the camera module 200 further comprises a sealing element 210. The sealing element 210 is configured between the housing 202 and the cover glass 206 to seal the camera module 200. The sealing element 210 is injection molded onto the housing 202 by 2K injection molding process in which the housing 202 and the sealing element 210 are manufactured by one injection molding machine. The material of the housing 202 and the material of the sealing element are injected into the same molding machine such that the housing 202 and the sealing element 210 are made as one unit. The molding of the housing 202 is preferably done first by injecting the material of the housing 202 into the molding machine followed by molding of the sealing element 210 onto the molded housing 202 part by injection of material of the sealing element 210 into the molding machine to obtain a single injection molded part having both the housing 202 and the sealing element 210 in one part.

The sealing element 210 is preferably made of material, TPE, EPDM, plastic or any moldable sealing material. The sealing element 210 is preferably made of compressible material which gets compressed and provides air-tight seal between the housing 202 and the cover glass 206 such that no dirt or moisture enter inside the camera module 200.

Figure 2:
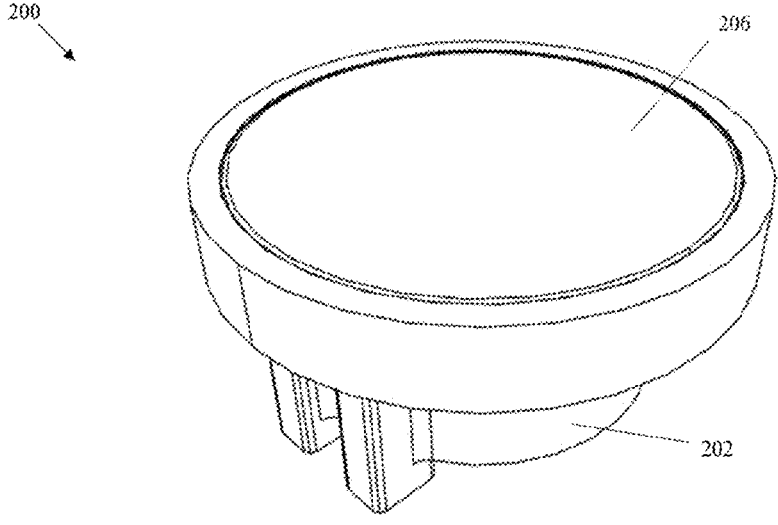
FIG. 2: illustrates a perspective view of camera module according to an embodiment of the present disclosure.

FIG. 2 illustrates a perspective view of the camera module 200 according to an embodiment of the present disclosure without showing the camera. FIG. 2 illustrates the cover glass 206 and the housing 202.

Figure 3:
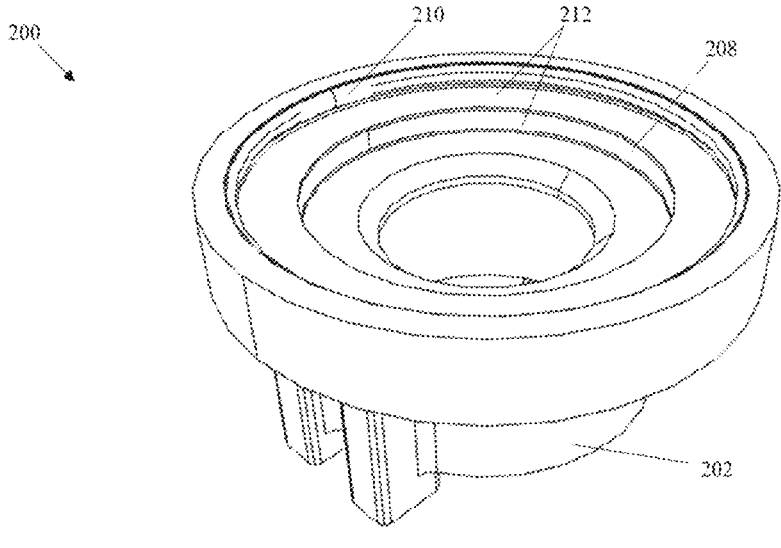
FIG. 3: illustrate a perspective view of the camera module of FIG. 2 with removed cover glass according to the present disclosure.

FIG. 3 illustrates a perspective view of the camera module 200 of FIG. 2 with the cover glass 206 removed for showing the sealing element 210, the piezo actuator 208 and the double-sided attaching means 112.

Figure 4:
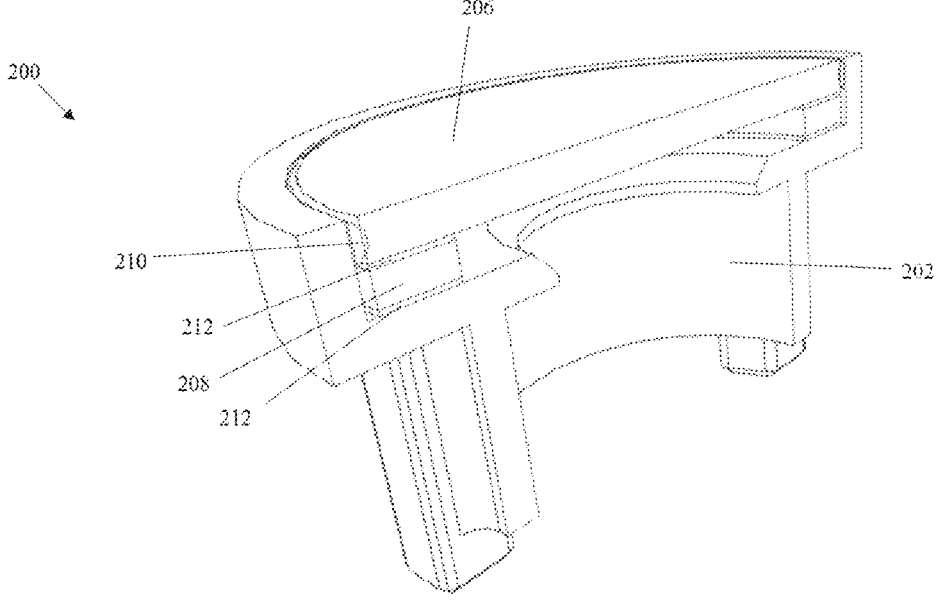
FIG. 4 illustrates a perspective sectional view of the camera module of FIG. 2 according to the present disclosure.

FIG. 4 illustrates a perspective sectional view of the camera module of FIG. 2, FIG. 5 illustrates a perspective sectional view of the camera module of FIG. 2. As shown in the embodiments of FIGS. 4 and 5, the camera module 200 includes the housing 202 on which the piezo actuator 208 is disposed by a double-sided attaching means 212. The double-sided attaching means 212 may also be configured to attach the cover glass 206 with the piezo actuator 208 directly such that when the piezo actuator 208 is actuated it vibrates the cover glass 206 for shaking off the dirt and moisture from the cover glass 206. The housing 202 is provided with the sealing element 210 which compressibly touches the cover glass 206. In this embodiment the sealing element 210 is in the shape of a trapezoidal ring which is configured to touch the lateral surface of the cover glass 206. In other embodiments, the sealing element 210 may be in the shape of semi-circular ring. Various other embodiments of the sealing element 210 is possible, wherein some of them are described in FIGS. 6a to 6e.

FIGS. 6a to 6e illustrate portion of section views of embodiments of the camera module 200 showing various embodiments of sealing element 210 according to the present disclosure. FIG. 6a shows an embodiment of the sealing element 210. As shown in the figure, the sealing element comprises two sealing lips configured to compressibly touch the cover glass 206 on the top and the bottom face of the cover glass 206. FIG. 6b shows another embodiment of the sealing element 210. As shown in the figure, the sealing element 210 has one sealing lip having non-uniform thickness. The sealing lip in this embodiment is configured to be compressed downwardly for providing the sealing between the housing 202 and the cover glass 206. The sealing lip in this embodiment is configured to compressibly touch the lateral surface of the cover glass 206. FIG. 6c shows another embodiment of the sealing element 210. This embodiment is similar to the previous embodiment except that this embodiment has three sealing lips instead of one sealing lip. FIG. 6d shows another embodiment of the sealing element 210. As shown in the figure, the sealing element 210 includes three sealing lips having finger like projections. The sealing lips of the sealing element 210 is configured to compressibly touch the lateral surface of the cover glass 206. FIG. 6e shows another embodiment of the sealing element 210. This embodiment is similar to the embodiment shown in FIG. 6b except that in this embodiment the sealing lip is configured to be compressed upwardly by the cover glass 206. In general, according to various embodiments the number of sealing lips of the sealing element 210 as well as the sealing element 210 itself may vary.

FIG. 7 illustrates a side view of the vehicle 300 showing the various locations of the camera module 200 according to the present disclosure. The vehicle 300 may comprise more than one camera module 200.

Although the subject matter of the present disclosure has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims. i.e. the features disclosed in the foregoing description, the claims, and the drawings may be essential, both individually and in any combination, for accomplishing the present disclosure in its various embodiments. The embodiments shown herein are only examples of the present disclosure and must therefore not be understood as being restrictive. Alternative embodiments considered by the skilled person are equally covered by the scope of protection of the present disclosure.

REFERENCE SIGNS

200 camera module
202 housing
202*a* first end of housing
202*b* second end of housing
204 camera
206 cover glass
208 piezo actuator
210 scaling element
212 attaching means
214 grommet
300 vehicle

The invention claimed is:

1. A camera module for a vehicle, comprising:
a housing having a first end and a second end opposite to the first end;
at least one camera disposed proximate to or on the first end of the housing;
at least one cover glass disposed proximate to or on the second end of the housing facing the at least one camera;
at least one actuator disposed between the housing and the at least one cover glass;
at least one grommet disposed between the at least one camera and the housing, wherein the at least one grommet is configured to absorb vibration from the vehicle and the at least one actuator; and
at least one sealing element disposed between the at least one cover glass and the housing,
wherein the at least one sealing element comprises a plurality of sealing lips configured to touch at least one of a lateral surface, a top surface, or a bottom surface of the at least one cover glass, wherein each of the plurality of sealing lips is independently configured to provide a seal between the housing and the at least one cover glass such that if one of the plurality of sealing lips is damaged or worn another one of the plurality of sealing lips will continue to provide the seal between the housing and the at least one cover glass,
wherein the at least one cover glass is configured to compressibly touch the at least one sealing element, and
wherein the at least one sealing element is injection molded onto the housing by a 2K injection molding process.

2. The camera module of claim 1, wherein the actuator is a piezo actuator.

3. The camera module of claim 1, wherein the housing and the at least one sealing element are manufactured as one unit.

4. The camera module of claim 1, wherein the at least one actuator is attached to the housing and the at least one cover glass by at least one attaching means.

5. The camera module of claim 4, wherein the at least one attaching means is double-sided.

6. The camera module of claim 4, wherein the at least one attaching means comprises an adhesive tape or glue.

7. The camera module of claim 1, wherein the housing is made of ABS, PC, PP, ASA, PMMA, PA, PE, HDPE, POM or combination thereof or any other moldable plastic or diecast.

8. The camera module of claim 1, wherein the at least one sealing element is made of TPE, EPDM, plastic or any moldable sealing material.

9. A vehicle comprising at least one camera module according to claim 1.

10. A method of assembling at least one camera module that includes a housing and at least one sealing element, the method comprising:
mounting at least one camera at or proximate to a first end of the housing;
fixing at least one actuator and at least one grommet onto the housing; and
fixing at least one cover glass onto the at least one actuator such that the at least one cover glass is facing the at least one camera,
wherein the at least one sealing element comprises a plurality of sealing lips configured to touch at least one of a lateral surface, a top surface, or a bottom surface of the at least one cover glass, wherein each of the plurality of sealing lips is independently configured to provide a seal between the housing and the at least one cover glass such that if one of the plurality of sealing lips is damaged or worn another one of the plurality of sealing lips will continue to provide the seal between the housing and the at least one cover glass,
wherein the at least one grommet is configured to absorb vibration from the vehicle and the at least one actuator,
wherein the at least one cover glass is configured to compressibly touch the at least one sealing element, and
wherein the at least one sealing element is injection molded onto the housing by a 2K injection molding process.

11. The method of claim 10, wherein the at least one actuator is a piezo actuator.

12. The method of claim 10, wherein the at least one actuator is fixed to the housing by at least one attaching means.

13. The method of claim 12, wherein the at least one attaching means is double-sided.

* * * * *